United States Patent
Mankude

(10) Patent No.: US 10,540,328 B1
(45) Date of Patent: Jan. 21, 2020

(54) WEB-SCALE DISTRIBUTED DEDUPLICATION

(71) Applicant: Cohesity, Inc., San Jose, CA (US)

(72) Inventor: Hariprasad Bhasker Rao Mankude, San Ramon, CA (US)

(73) Assignee: Cohesity, Inc., San Jose, CA (US)

(*) Notice: Subject to any disclaimer, the term of this patent is extended or adjusted under 35 U.S.C. 154(b) by 452 days.

(21) Appl. No.: 14/876,579

(22) Filed: Oct. 6, 2015

Related U.S. Application Data

(60) Provisional application No. 62/060,367, filed on Oct. 6, 2014.

(51) Int. Cl.
*G06F 7/00* (2006.01)
*G06F 17/30* (2006.01)
*G06F 16/174* (2019.01)
*G06F 16/182* (2019.01)

(52) U.S. Cl.
CPC ........ *G06F 16/1752* (2019.01); *G06F 16/182* (2019.01)

(58) Field of Classification Search
CPC .... G06F 3/0608; G06F 3/0689; G06F 3/0641; G06F 16/1752; G06F 16/182; G06F 17/30156
USPC ................... 707/674, 692, 813, 664
See application file for complete search history.

(56) References Cited

U.S. PATENT DOCUMENTS

| | | | |
|---|---|---|---|
| 8,156,306 B1* | 4/2012 | Raizen | G06F 3/0608 707/813 |
| 8,683,153 B1* | 3/2014 | Long | G06F 3/0608 711/112 |
| 8,977,812 B1* | 3/2015 | Chen | G06F 3/0608 707/692 |
| 2012/0150826 A1* | 6/2012 | Vijayan Retnamma | G06F 17/30312 707/692 |
| 2012/0158672 A1* | 6/2012 | Oltean | G06F 17/3007 707/692 |
| 2015/0134623 A1* | 5/2015 | Liu | G06F 17/30156 707/692 |
| 2015/0363419 A1* | 12/2015 | Chennamsetty | G06F 17/30156 707/664 |

* cited by examiner

*Primary Examiner* — Md I Uddin
(74) *Attorney, Agent, or Firm* — Van Pelt, Yi & James LLP

(57) ABSTRACT

Approaches for parallelized data deduplication. An instruction to perform data deduplication on a plurality of files is received. The plurality of files is organized into two or more work sets that each correspond to a subset of the plurality of files. Responsibility for performing each of said two or more work sets is assigned to a set of nodes in a cluster of nodes. The nodes may be physical nodes or virtual nodes. Each node in the set performs data deduplication on a different work set. In performing data deduplication, each node may store metadata describing where shared chunks of data are maintained in a distributed file system. The shared chunks of data are two or more sequences of bytes which appear in two or more of said plurality of files.

17 Claims, 8 Drawing Sheets ized data deduplication.

CLAIM OF PRIORITY

This application claims priority to U.S. Provisional Patent Application No. 62/060,367, entitled "Web-Scale Distributed Deduplication, filed on Oct. 6, 2014, the contents of which are hereby incorporated by reference for all purposes as if fully set forth herein.

FIELD OF THE INVENTION

Embodiments of the invention relate to parallelized data deduplication.

BACKGROUND

Deduplication is a technique commonly used in the computer storage industry to reduce the storage footprint by removing common portions of files. Deduplication is typically performed by reading a file and converting the read file into a stream of bytes. Then, smaller chunks of data are created from the stream of bytes. A cryptographic hashing algorithm, such as for example SHA-2, is used to create a unique fingerprint for each smaller chunk. The fingerprint for each chuck is then compared against a database of existing fingerprints.

If a particular fingerprint is not in the database of existing fingerprints, then the fingerprint is unique and (a) that fingerprint is added to the database of existing fingerprints and (b) the chunk of data associated with the new unique fingerprint is also saved as the chunk of data is unique and is not a duplicate of another chunk of data. However, if a particular fingerprint is already in the database of existing fingerprints, then the chunk of data associated with that fingerprint is a duplicate of a previously encountered chunk of data. When a duplicate chunk is encountered, a reference is added to the fingerprint that this chunk has been found in a different file at a particular offset. In addition, when encountering a duplicate chunk, the metadata for the original file is updated to include a fingerprint reference so that the file can be reconstructed during read operations. The duplicate chunk is not stored once more, thereby resulting in storage savings.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Figure 1:
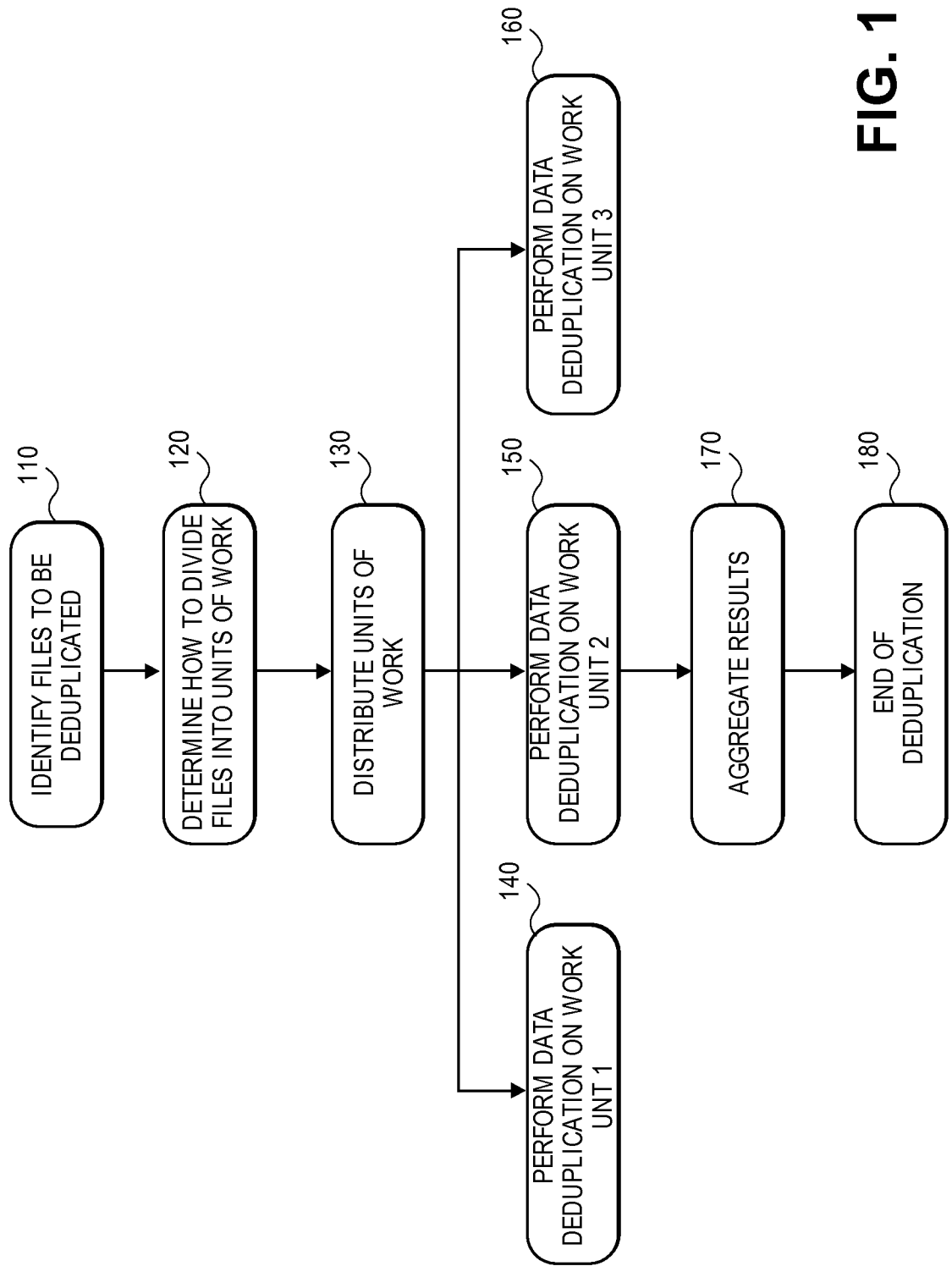
FIG. 1 is a diagram illustrating the process of performing parallel data deduplication according to an embodiment of the invention.

Approaches for performing parallelized data deduplication are presented herein. In the following description, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

It has been observed that prior approaches for performing data deduplication exhibit certain limitations and undesirable requirements. For example, the cryptographic hashing algorithm used in the data deduplication process is a central processing unit (CPU) intensive activity. Also, the number of parallel threads that can perform deduplication work is also limited by the number of cores in the CPU. The current generation of deduplication algorithms possesses a limited ability to scale and is inoperable in cluster environments having potentially hundreds of nodes.

As another example of the challenges of prior data deduplication techniques, comparing a new fingerprint against a set of existing fingerprints to determine if the new fingerprint is included in a set of existing fingerprints typically involves storing the set of existing fingerprints in memory, which imposes certain restrictions on the size of the existing fingerprint list. Another limitation with current approaches for performing data deduplication is that both (a) writing a chunk to disk if the chunk is found to be unique and (b) updating a reference from the pre-existing stored copy of the chunk to another copy of that chunk within a file are disk intensive activities, which burdens the performance of prior deduplication systems.

Advantageously, embodiments of the invention avoid the problems and overcome the challenges associated with prior approaches. In an embodiment, data deduplication is performed in a parallelized fashion by having a plurality of nodes of a cluster each perform certain deduplication activities upon a dataset. The dataset comprising of files and directories may be divided or split into groups based on sizes. One or more of these groups are assigned to all the nodes of the cluster. The deduplication algorithm of an embodiment is executed in a completely parallel manner on each of these groups (or 'splits') on all the cluster nodes. Note that there is no synchronization required between the various instances of the deduplication algorithm of an embodiment that is being executed in parallel. Additional nodes may be added to the cluster ensuring that embodiments of the invention may scale to accommodate datasets of any size. The cluster is elastic as nodes may be added to or removed from the cluster based on need.

Metadata is created and maintained by nodes of the cluster; this metadata may be stored in tables in a parallel database (such as but not limited to a No SQL database, e.g., Apache Hbase™ or Apache Cassandra™). By storing the metadata in rows of different tables in a parallel database, access and updates to the metadata is no longer a bottleneck in performing data deduplication. As metadata is stored in a parallel database, the metadata can accessed from all the nodes of the cluster Further, in an embodiment, all unique chucks of data are stored in logical containers, which themselves are stored in a distributed file system. By storing the chunks of data in logical containers within a distributed file system, the chunks of data are accessible by any node of the cluster. The nodes of a cluster may be physical nodes or may be virtual nodes. Additional features and advantages of embodiments shall be discussed in greater detail below.

Parallel Data Deduplication

FIG. 1 is a diagram illustrating the process of performing parallel data deduplication according to an embodiment of the invention. The process flow of FIG. 1 will be explained below with reference to FIG. 2, which is a block diagram of a system for performing parallel data deduplication according to an embodiment. Prior to describing FIG. 1, it will be beneficial to review the system components shown in FIG. 2.

Figure 2:
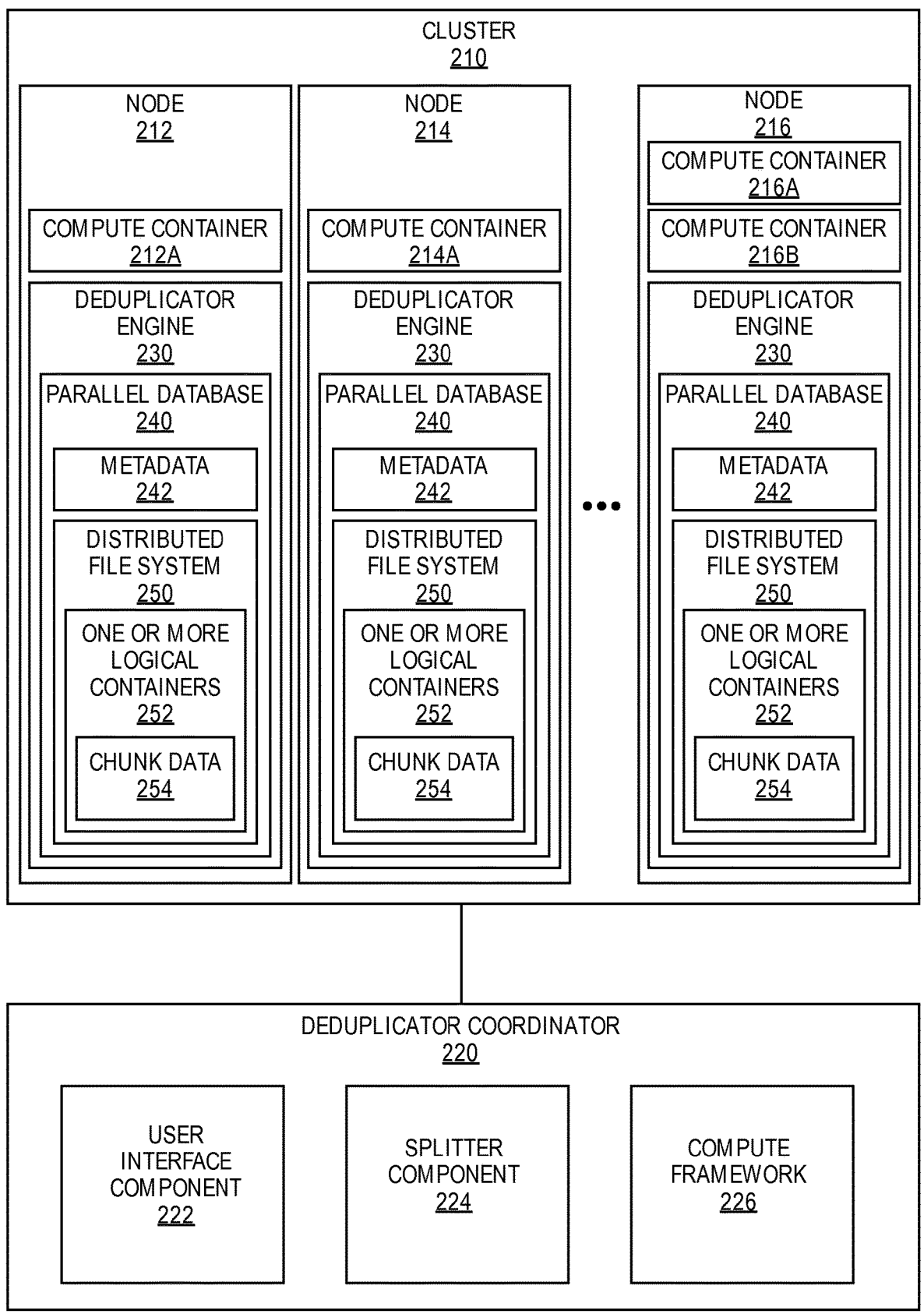
FIG. 2 is a block diagram of a system for performing parallel data deduplication according to one embodiment of the invention.

FIG. 2 depicts a cluster 210 comprising a plurality of nodes. Cluster 210 may comprise any number of nodes; while three nodes, namely nodes 212, 214, and 216, are depicted in FIG. 2, cluster 210 is designed to allow the addition or removal of nodes during the operation of cluster 210 based on the needs of the system at that time. Each node of cluster 210 may correspond to a physical node or a virtual node.

Each node of cluster 210 may comprise one or more compute containers. For example, node 212 comprises compute container 212A, node 214 comprises compute container 214A, and node 216 comprises compute containers 216A and 216B. A compute container, such as compute contains 212A, 214A, 216A, and 216B, refers to an individual compute element residing on a node. Each compute container may perform data deduplication on a different list of files. As a particular node might contain two or more compute containers, it is possible for a single node to comprise multiple compute containers that each perform data deduplication activities on different sets of files.

Deduplicator coordinator 220 is software that is responsible for assigning work to, and receiving results from, cluster 210. In an embodiment, deduplicator coordinator 220 may be implemented by one or more software processes acting in concert. Deduplicator coordinator 220 may execute on a single computer system or on a plurality of computer systems for scalability and fault-redundancy purposes. In an embodiment, deduplicator coordinator 220 may, but need not, execute entirely or partially on a computer system corresponding to a physical node of cluster 210 or on which a virtual node of cluster 210 executes.

Deduplicator coordinator 220 may comprise user interface component 222, splitter component 224, and compute framework 226. User interface component 222 refers to software designed to display data to a user and to receive user instructions. For example, a user might make use of user interface component 222 to specify one or more file on which the user wishes to perform data deduplication. As another example, the results of performing data duplication may be displayed on user interface component 222.

Splitter component 224 refers to software that is responsible for determining groups of files on which a particular compute container performs data deduplication.

Compute framework 226 refers to a software framework for processing parallelizable work sets using nodes of cluster 210. Compute framework 226 may correspond to a custom build framework or to an existing framework such as MapReduce or Apache Hadoop YARN. Compute framework 226 may identify which compute container or which node in cluster 210 should be assigned responsibility for performing data deduplication on a list of files.

Deduplicator engine 230 refers to software primarily responsible for storing data in a manner that makes it accessible to any node of cluster 210. Note that deduplicator engine 230 may be installed on each node of cluster 210, as depicted in FIG. 2.

In an embodiment, deduplicator engine 230 may comprise or be implemented using parallel database 240. Parallel database 240 is accessible from each node of cluster 210. Non-limiting, illustrative examples of parallel database 240 include Apache Hbase™ or Apache Cassandra™.

In an embodiment, deduplicator engine 230 may store metadata 242 within parallel database 240. Metadata 242 is data that identifies whether a file has been deduplicated; metadata 242 also comprises information about how to reconstruct a file if the file has been deduplicated. For example, metadata 242 may comprise global tables with a fingerprint as the row key to facilitate ease of use in performing lookups or queries.

In an embodiment, the namespace of distributed file system 250 is available to all nodes of cluster 210. A non-limiting, illustrative example of distributed file system 250 is the Hadoop Distributed File System (HDFS).

In an embodiment, chunks of data (depicted in FIG. 2 as chunk data 254) may be stored in one or more logical containers 252 within distributed file system 250. One or more logical containers 252 are stored in distributed file system 250 and contain unique chunks that are the output of the deduplication algorithm of an embodiment. A logical container may be a file. Metadata 242 describing the container file is stored in parallel database 240. The container metadata table has references to the fingerprint metadata table so that file can be reconstructed by picking relevant chunks of data when the file is read.

Nodes of cluster 210 and deduplicator coordinator 220 may each communicate with each other over a wired or wireless computer network, such as but not limited to the Internet or an Intranet.

Returning again to the steps of FIG. 1, in step 110, a user specifies a set of files upon which the user wishes to perform data deduplication. A user might perform step 110 by using user interface component 222 to specify the set of files to be deduplicated. A user may perform step 110 by directly identifying a set of files or indirectly identifying an object associated with a set of files. For example, a user might perform step 110 by identifying a directory or folder containing the set of files upon which data deduplication is desired to be performed. As a result of performing step 110, deduplicator coordinator 220 is informed of the set of files upon which the user desires to perform data deduplication.

In step 120, splitter component 224 scans the set of files identified in step 110 to determine how to divide the set of files into units of work which may be assigned to nodes, or perhaps directly to a compute container, for processing. A unit of work created by splitter component 224 may correspond to a list of files to be deduplicated, where the list of files is a subset of the set of files identified in step 110. The one or more lists of files created in step 120 may be created so that the size of each list of files is under a certain size.

For example, splitter component 224 may scan the set of files identified in step 110 and assign each file to a first list of files until a certain default size for the list of files is reached (for example, 20 GB). Thereafter, splitter component 224 may continue to scan the set of files identified in step 110 and assign each file to another list of files until the default size is reached again. This process may be repeated until all of the set of files identified in step 110 are assigned to a set of files. The default size mentioned herein is merely an example, as other embodiments might use a different default size or may permit the user to configure the default size of a unit of work. Other embodiments might use different approaches for dividing the set of files identified in step 110 into one or more lists of files.

Thereafter, in step 130, splitter component 224 provides the lists of files created in step 120 to compute framework 226. Compute framework 226 is aware of all the nodes of cluster 210 which can participate in performing data deduplication on the one or more lists of files determined in step 120. Compute framework 226 will distribute each of the lists of files to a node of cluster 210; compute framework 226 may distribute lists of files to nodes according to a variety of different algorithms. For example, in an embodiment, compute framework 226 may distribute lists of files such that each node of cluster 210 receives one list of file before receiving a second list of files. According to another embodiment, compute framework 226 may distribute lists of files such that each compute container in cluster 210 receiving one list of file before receiving a second list of files. Other embodiments may consider additional factors, such as the available bandwidth or processing power, when distributing lists of files to cluster 210.

Once a node receives a list of files, if compute framework 226 did not specific which compute container on that node is assigned responsibility for performing data deduplication on the list of files, then the node itself may make that assignment. Note that a single node might have one or more compute containers, e.g., node 216 in FIG. 2 possesses multiple compute containers. The compute framework 226 may assign multiple splits to a single node of cluster 210 so that all the compute containers in that single node are actively parallel in their operation.

Once each compute container receives a list of files, each compute container scans the files in the list of files, performs data deduplication on each of the files in the list of files, and generates statistics. For example, steps 140, 150, and 160 represent an example where splitter component 224 creates three lists of files. Thereafter, compute framework 226 provides the first list of files to compute container 212A on node 212, the second list of files to compute container 214A on node 214, and the third list of files to compute container 216A on node 216. Each of compute containers 212A, 214A, and 216A perform data deduplication on their assigned list of files. Each of the files in the list of files assigned to a compute container resides in distributed file system 250 and is accessible to that node or compute container.

In step 170, after each compute container finishes performing data deduplication on the files assigned to that compute container, each compute container notifies compute framework 226. After receiving such notification, compute framework 226 may assign additional list of files to compute containers or nodes for processing when those entities have finished with their prior assigned tasks.

In an embodiment, as each compute container finishes performing data deduplication on the files assigned to that compute container, each compute container may transmit statistics or other information regarding the results of performing data deduplication to compute framework 226. As compute framework 226 receives statistics regarding completed work from compute containers, compute framework 226 may aggregate the results. Once all the set of files identified in step 110 have been deduplicated by cluster 110, processing proceeds to step 180, where the data deduplication process is completed.

Additional details will now be provided regarding deduplicator engine 230.

Metadata Stored in the Parallel Database

As depicted in FIG. 2, parallel database 240 stores metadata 242 involved in the deduplication process in one or more tables. Embodiments may store metadata 242 in one or more tables in parallel database 240. To provide a concrete example of how parallel database 240 may store metadata 242, illustrative tables used by an embodiment to store metadata 242 will be described below.

Figure 3:
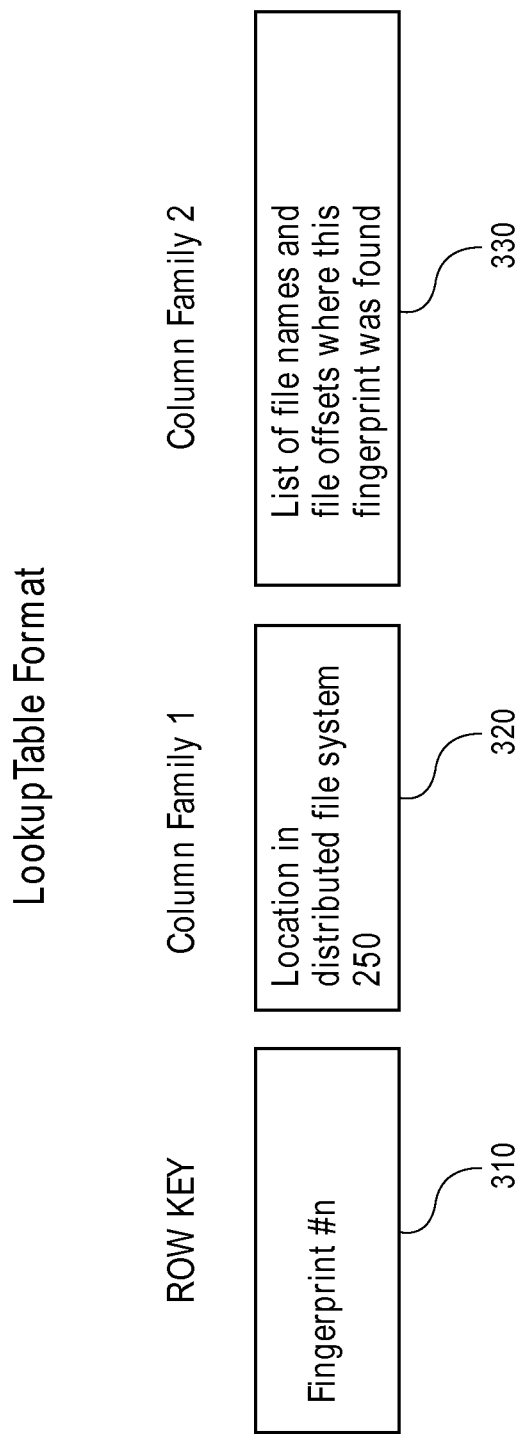
FIGS. 3 and 4 are illustrations certain formats of database tables used to store portions of metadata in a parallel database by an embodiment of the invention.

FIG. 3 is an illustration of a format of a database table (referred to herein as "Lookup Table") used to store portions of metadata 242 in parallel database 240 by an embodiment of the invention. The Lookup Table of FIG. 3 may be used to store information about all the fingerprints that are currently stored in cluster 110. As with any database table, there is a row key column 310 and there are two columns 320 and 330 storing information that describes the row key. Row key column 310 stores values uniquely identifying a particular fingerprint. Column 320 stores references to a location where the data corresponding to a fingerprint is stored. For example, values in column 320 may identify particular rows in the UniqueDataMetaStore table of FIG. 4 described below. Column 330 may store a list of filenames and locations where chunks of data associated with the fingerprint have been found. Essentially, column 330 serves a reference count for a particular fingerprint.

Another table which may be used by parallel database 240 to store portions of metadata 242 is the MetaBlock table. The MetaBlock table may be used to store a list of fingerprints for a single file along with their locations in the UniqueDataMetaStore Table of FIG. 4.

Figure 4:
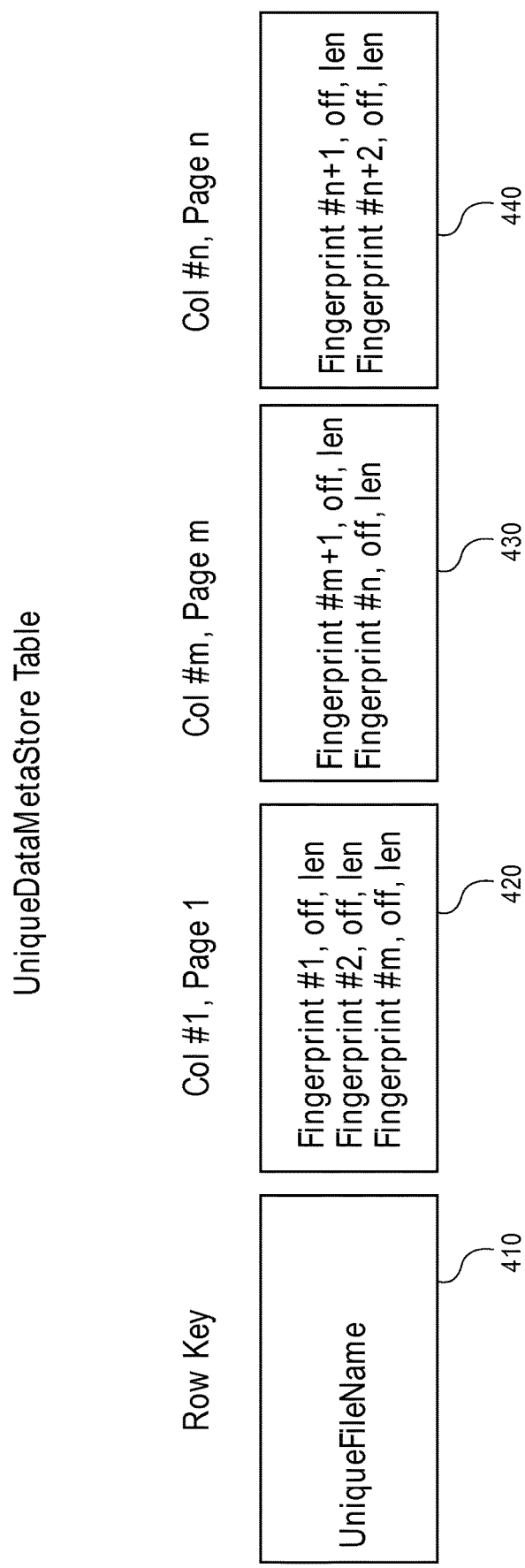

FIG. 4 is an illustration of a format of a database table (referred to herein as the "UniqueDataMetaStore table") used to store portions of metadata 242 in parallel database 240 by an embodiment of the invention. The UniqueDataMetaStore Table stores portions of metadata 242 corresponding to unique data chucks that have been generated as an output of the deduplication process. More particularly, this table may stores, for a particular file identified in column 410, a listing of fingerprints in that file and their offsets and length organized as pages (columns 420, 430, and 440). The actual unique data generated as output of the deduplication process is stored in distributed file system 250.

Deduplication Process

Each compute container may perform a separate data deduplication process on a distinct set of files. A compute container may perform data duplication according to the flowchart of FIG. 5. Step 502 of FIG. 5 corresponds to the start of a deduplication process. A deduplication process is initiated at each of steps 140, 150, and 160 in the example of FIG. 1. Thus, step 502 may be performed when a list of files is provided to a compute container and a data deduplication process is initiated upon the list of files.

For purposes of providing a concrete example, the steps of FIG. 5 shall be explained below with reference to compute container 212A receiving a list of files upon which a data duplication process is to be performed. Those files may be stored in distributed file system 250 with a unique file name.

In step 504, a single file is read from the list of files by compute container 212A. The file which was read is converted into a stream of bytes by compute container 212A.

Also in step 504, compute container 212A create a new file in distributed file system 250 having a unique file name. A unique universal identifier generation process may be used to create the unique file name. This newly created file (termed "the unique chunk file") is used by compute container 212A to store unique chunks in the stream of bytes. All the unique chunks identifies in files assigned to compute container 212A as of step 502 will be written to the unique chunk file. The file name of the unique chunk file is used as a row key (in column 410) for the UniqueDataMetaStore table maintained by parallel database 240.

In step 506, variable sized chunks of data are created using a fingerprinting algorithm, such as but not limited to Rabin's fingerprinting algorithm. To do so, the stream of bytes created is step 504 is processed using a chunking algorithm which converts the stream of bytes into chunks of data. The chunking algorithm may use a specified bit pattern to identify chunk boundaries in the stream of bytes. The boundaries identified by the chunking algorithm will be the start and end of the chunk. Since boundaries can happen anywhere in the byte stream, the sizes of the chunks can vary. The goal of step 506 is to ensure that if two files are different by few bytes inserted into one of the files, the chunking algorithm will ensure that but for few a chunks, all other chunks in those two files will remain identical.

In step 508, a SHA-2 algorithm is used to create fingerprints on the chunks of data identified in step 506.

In step 510, each fingerprint created in step 508 is examined to determine if the fingerprint already exists or is present in parallel database 240. An embodiment may perform step 510 by looking up each fingerprint created in step 508 to determine if it is already present in the Lookup Table of FIG. 3. Note that the node hosting the Lookup Table may be on the local node or on a remote node in cluster 230, as parallel database 240 is a distributed database. The Lookup Table may be stored entirely in memory on various nodes in cluster 210 by sharding the data across the entire cluster 210 using different types of data partitioning algorithms to ensure the performance of the deduplication process is not adversely affected by reading from disk or persistent storage. Since the row keys and data stored in the Lookup table are shared and distrusted across various nodes of cluster 210, the deduplication process is infinity scalable.

In step 512, a determination is made as to whether a particular fingerprint examined in step 510 already exists or is present in parallel database 240. If the particular fingerprint does already exist or is present in parallel database 240, then this implies that the chunk associated with that particular fingerprint is a duplicate chunk. If the determination of step 512 is affirmative, then processing proceeds to step 522. If the determination of step 512 is negative, then processing proceeds to step 514.

Step 514 is performed when the particular fingerprint does not already exist or is present in parallel database 240. In step 514, a new row is created in the Lookup Table of FIG. 3 with the fingerprint as the row key. The original file name, offset, and length are added to this row in the table. By adding the original file name, offset, and length, a reference to the row key is created which ensures that the row key will not be deleted.

In step 516, a new entry is added to the UniqueDataMetaStore table of FIG. 4. This new entry identifies for the current chunk the fingerprint, a file offset in the file where the chunk is stored, and the length of the chunk. The chunk data is written to distributed file system 250. FIG. 2 depicts the chunk data written to distributed file system 250 as chunk data 254. The chunk data may be compressed using bzip2 or other advanced compression algorithms before it is written to distributed file system 250.

In step 518, the Lookup table of FIG. 3 is updated with location information for the chunk from the UniqueDataMetaStore table of FIG. 4. Such location information for the chunk may include a unique identifier for the chunk, a file offset, and a length.

In step 520, the MetaBlockTable is updated to indicate, for the originate file, the fingerprint, offset, and length information. Thereafter, if there any remaining chunks in the file which have not yet been processed, then processing proceeds back to step 510 so that the next chunk in the file may be processed; otherwise, if all chunks present in a file have been processed, then the file has been deduplicated and the process of FIG. 5 ends.

Step 522 is performed in the case where the fingerprint of a chunk is already present in parallel database 240. In step 522, the filename and offset where the chunk boundary began and the length of the chunk is stored in the row corresponding to the fingerprint. In effect, this adds a reference between the fingerprint and the chunk in the file being processed.

In step 524, the MetaBlock table of the original file is updated to include the fingerprint offset and length information. Thereafter, if there any remaining chunks in the file which have not yet been processed, then processing proceeds back to step 510 so that the next chunk in the file may be processed; otherwise, if all chunks present in a file have been processed, then the file has been deduplicated and the process of FIG. 5 ends.

Figure 5:
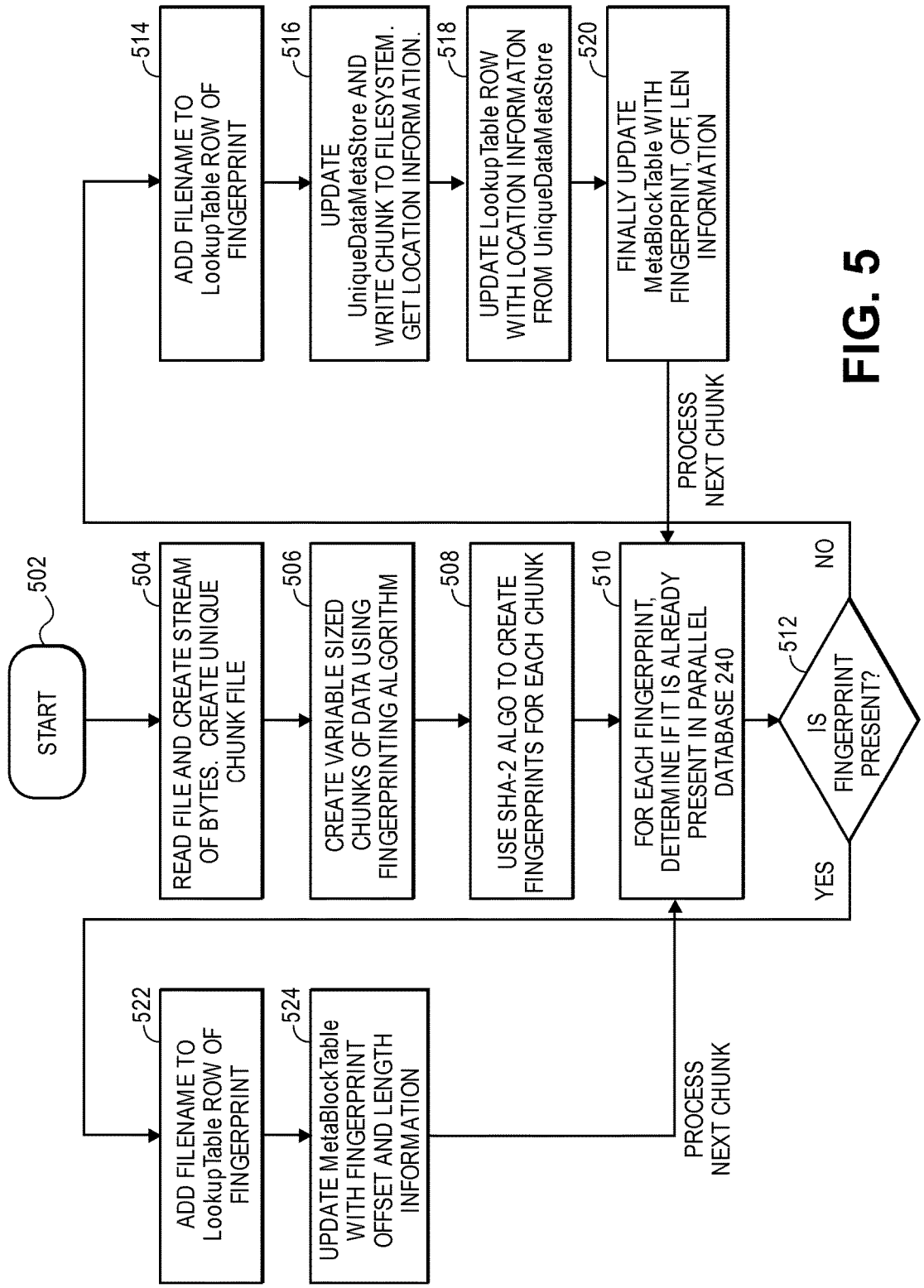
FIG. 5 is a flowchart of the steps of performing data duplication at a compute container according to an embodiment of the invention.

The steps of FIG. 5 may be used to deduplicate a single file; by repeating the steps of FIG. 5, multiple files may be deduplicated. Note that other embodiments of the invention may perform deduplication using additional technique other than those explicitly outlined above.

Reading a Deduplicated File

After a file has been deduplicated, the original contents of the file have been deleted leaving behind only the file metadata in distributed file system 250. A read system call will read the file metadata from distributed file system 250; the file metadata will indicate that the file has been deduplicated. The read implementation will then follow a process to reconstruct the data which will be distributed across chunks stored in various files in distributed file system 250.

Figure 6:
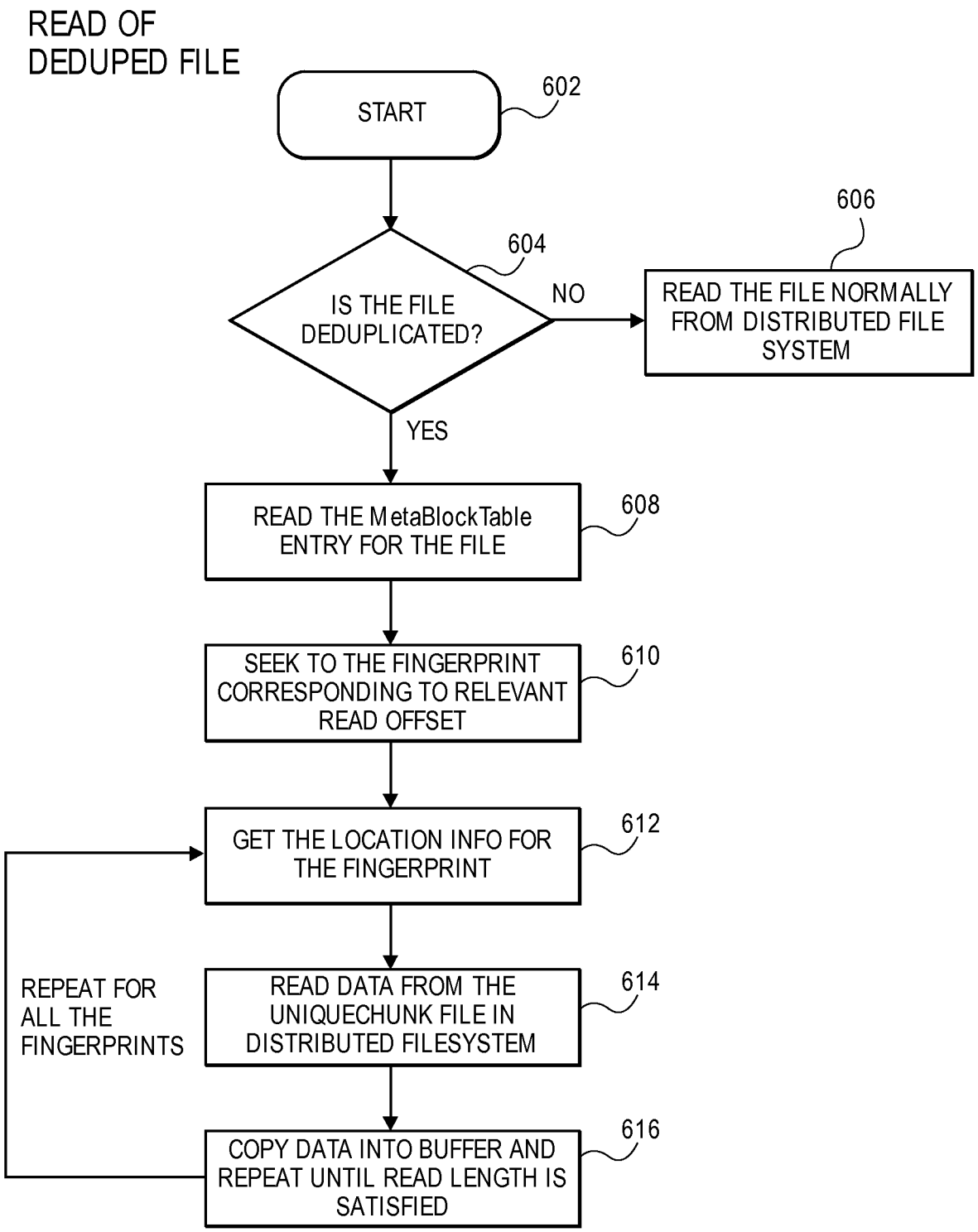
FIG. 6 is a flowchart of the steps involved in reading a deduplicated file according to an embodiment of the invention.

FIG. 6 is a flowchart of the steps involved in reading a deduplicated file according to an embodiment of the invention. In step 602, the user initiates a read operation on a particular file stored in distributed file system 250.

In step 604, metadata 242 stored in distributed file system 250 is checked to determine if the file has been deduplicated or not.

In step 606, if it is determined that the file has not been deduplicated, then a normal read operation is performed on the file.

In step 608, as it was determined that the file has been deduplicated, the file path is used as the row key for the lookup into the MetaBlockTable in parallel database 240. The actual region owning this row key could be local or remote to the particular cluster node performing the read operation.

In step 610, the row key lookup will return the column information regarding the list of fingerprints identifying chunks of data in the file. These fingerprints are sequentially ordered according to the offsets of chunks in the file.

In step 612, if the read is at a non-zero offset, a query is done to identify the appropriate fingerprint representing the starting offset of the read.

In step 614, corresponding chunk location information of the fingerprint in terms of filename offset and length is obtained from UniqueDataMetaStore table.

In step 616, the data is then read from the files representing unique chunks. Steps 612-616 may be repeated until the entire read length is satisfied.

Deletion of Deduplicated File

Figure 7:
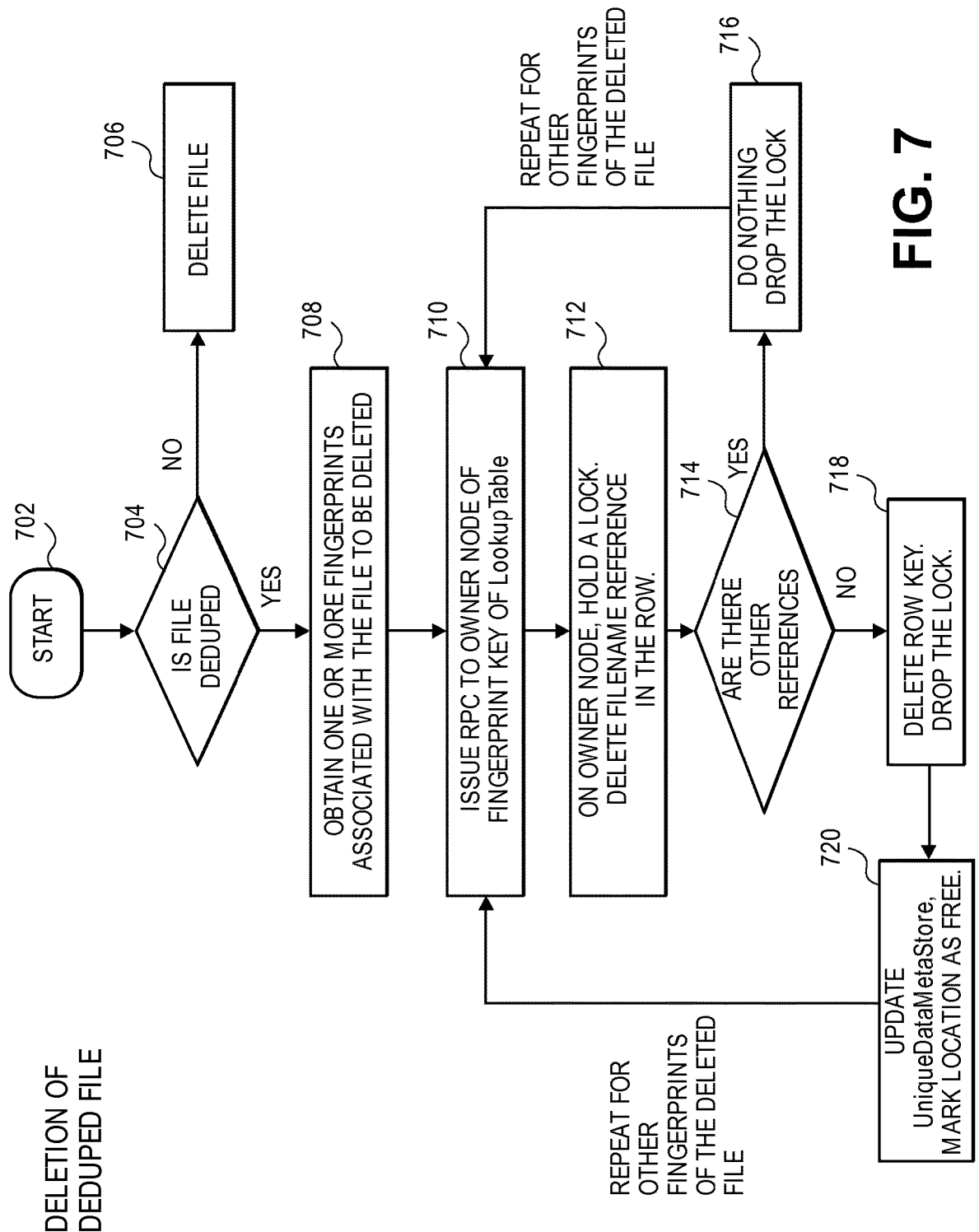
FIG. 7 is a flowchart of the steps involved in deleted a deduplicated file according to an embodiment of the invention.

Deletion of a file in distributed file system 250 should be performed with care to prevent data corruption and loss of data. Data loss and corruption may result when a chunk is being deleted while another file is referencing the same chunk. FIG. 7 is a flowchart of the steps involved in deleted a deduplicated file according to an embodiment of the invention. Note that the deletion of a file may be performed on an entirely different node of cluster 210 than the node on which the file was deduplicated.

In step 702, the user initiates a delete file operation on a particular file stored in distributed file system 250.

In step 704, metadata 242 stored in distributed file system 250 is checked to determine if the file has been deduplicated or not.

In step 706, if it is determined that the file has not been deduplicated, then a normal delete file operation is performed on the file.

If it is determined that the file has been deduplicated, then in step 708, the MetaBlock table is queried to obtain a list of fingerprints for the file desired to be deleted.

In step 710, one of the fingerprints obtained in step 708 is used to query to Lookup Table of FIG. 3. This query is performed on the node of cluster 210 which is actually storing the fingerprint row key.

In step 712, on the hosting node, a row lock is obtained on the row correspond to the row key. The file name reference corresponding to the file being deleted is removed from the column.

In step 714, a determination is then made as to whether there are other references to this fingerprint row key. If there are other references, then this implies that there are other files that are using this chunk and hence have references to this chunk. Thus, if there are other references, then processing proceeds to step 716, where the lock is dropped. After dropping the lock in step 716, then processing returns to step 710 so that other fingerprints on the deleted file may be processed. If there are no other fingerprints, then the process ends and the file is deleted.

However, if there are no other references in the determination of step 714, then this implies that there are no other files that are using this chunk, and thus, processing proceeds to step 718. In step 718, the row key is deleted and then the row lock is dropped.

In step 720, the corresponding location in UniqueDataMetaStore table is marked as free, thus ensuring that any garbage collection jobs running asynchronously will free up the space in the file corresponding to the chunk that has been freed. After dropping the lock in step 716, then processing returns to step 710 so that other fingerprints may be processed. If there are no other fingerprints, then the process ends and the file is deleted.

Hardware Mechanisms

Figure 8:
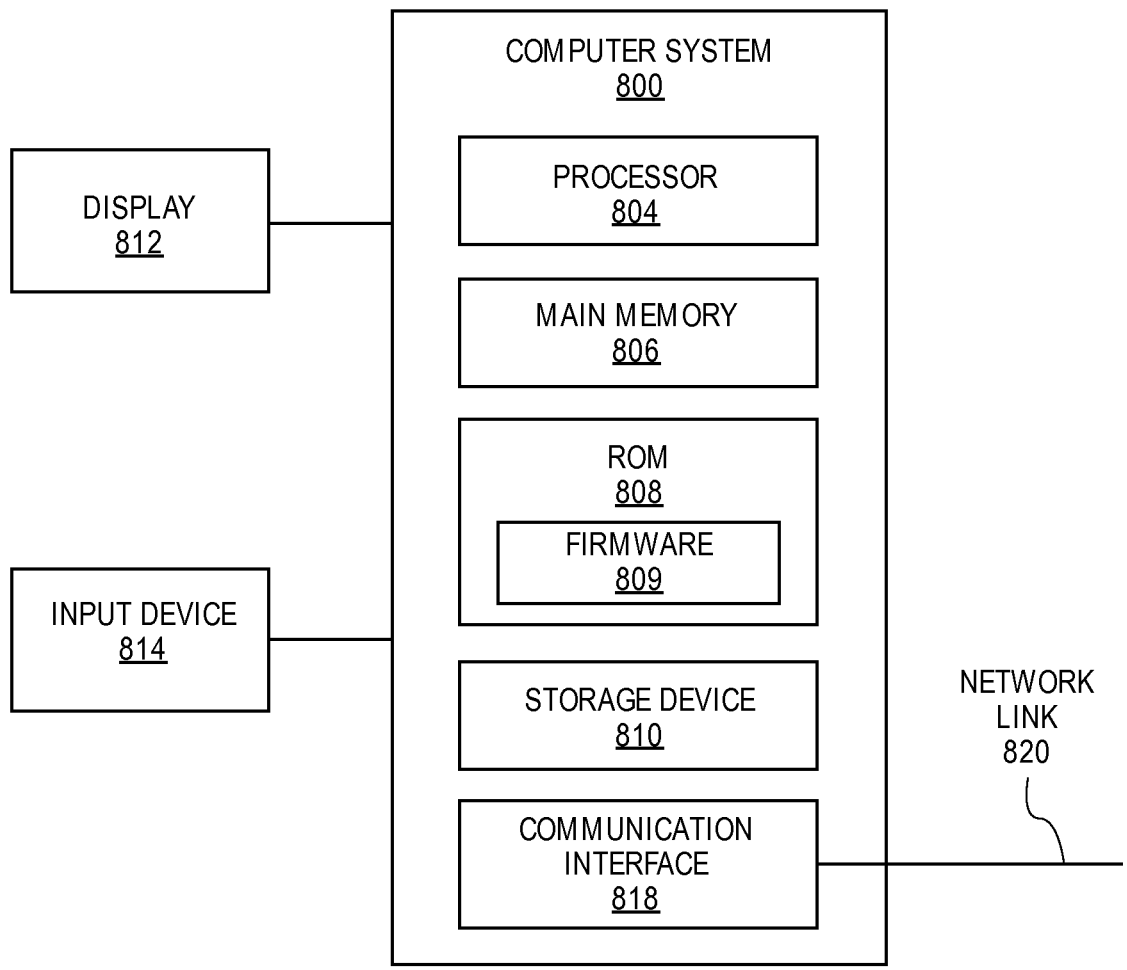
FIG. 8 is a block diagram that illustrates the hardware components of a computer system upon which an embodiment of the invention may be implemented.

In an embodiment, each node of cluster 210 may be implemented using a computer system. Additionally, deduplicator coordinator 220 may be implemented using one or more computer systems, e.g., multiple computer systems may be used for fault-tolerant or scalability purposes. FIG. 8 is a block diagram that illustrates a computer system 800 upon which an embodiment of the invention may be implemented. In an embodiment, computer system 800 includes processor 804, main memory 806, ROM 808, storage device 810, and communication interface 818. Computer system 800 includes at least one processor 804 for processing information. Computer system 800 also includes a main memory 806, such as a random access memory (RAM) or other dynamic storage device, for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device for storing static information and instructions for processor 804. A storage device 810, such as a magnetic disk or optical disk, is provided for storing information and instructions.

Computer system 800 may be coupled to a display 812, such as a cathode ray tube (CRT), a LCD monitor, and a television set, for displaying information to a user. An input device 814, including alphanumeric and other keys, is coupled to computer system 800 for communicating information and command selections to processor 804. Other non-limiting, illustrative examples of input device 814 include a mouse, a trackball, or cursor direction keys for communicating direction information and command selections to processor 804 and for controlling cursor movement on display 812. While only one input device 814 is depicted in FIG. 8, embodiments of the invention may include any number of input devices 814 coupled to computer system 800.

Embodiments of the invention are related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 804 for execution. Such a medium may take many forms, including but not limited to, non-volatile media and volatile media. Non-volatile media includes, for example, optical or magnetic disks, such as storage device 810. Volatile media includes dynamic memory, such as main memory 806.

Non-limiting, illustrative examples of machine-readable media include, for example, a floppy disk, a flexible disk, a hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 804 for execution. For example, the instructions may initially be carried on a magnetic disk of a remote computer. The remote computer can load the instructions into its dynamic memory and send the instructions over a network link 820 to computer system 800.

Communication interface 818 provides a two-way data communication coupling to a network link 820 that is connected to a local network. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through a local network to a host computer or to data equipment operated by an Internet Service Provider (ISP).

Computer system 800 can send messages and receive data, including program code, through the network(s), network link 820 and communication interface 818. For example, a server might transmit a requested code for an application program through the Internet, a local ISP, a local network, subsequently to communication interface 818. The received code may be executed by processor 804 as it is received, and/or stored in storage device 810, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory machine-readable storage mediums storing one or more sequences of instructions for parallelized data deduplication, which when executed by one or more processors, cause:

in response to receiving an instruction to perform data deduplication on a plurality of files of a big data dataset, organizing said plurality of files into a plurality of work sets based, at least in part, upon file size, wherein each of the plurality of work sets is a corresponding subset of said plurality of files, wherein each corresponding subset having a collective size below a certain predetermined threshold, wherein said data deduplication is a process which reduces an amount of digital storage required to persistently store said big data dataset by removing certain common portions of said files from said digital storage;

assigning a corresponding work set to a corresponding node included in a cluster of nodes, wherein said cluster of nodes itself performs said assignment of responsibility; and performing data deduplication in parallel by each of the nodes of the cluster, wherein each of the nodes of the cluster is configured to perform data deduplication on a corresponding assigned work set, wherein performing data deduplication comprises storing metadata describing where shared chunks of data are maintained in a distributed file system, and wherein said shared chunks of data are two or more sequences of bytes which appear in two or more of said plurality of files, wherein said metadata is stored in a parallel database and is accessible from any node of said cluster of nodes and the chunks of data are created from a stream, wherein the boundaries of the chunks of data are identified by using one or more fingerprinting algorithms;

in response to a node of the cluster of nodes finishing performing data deduplication on the corresponding assigned work set, assigning an additional work set to the node of the cluster of nodes, wherein the node of the cluster of nodes is configured to perform data deduplication on the assigned additional work set;

aggregating results of performing said parallel data deduplication in said cluster of nodes; and deleting a deduplicated file, wherein metadata associated with the deleted deduplicated file is stored by the nodes of the cluster, wherein the metadata associated with the deleted deduplicated file indicates that the deduplicated file has been deduplicated.

2. The one or more non-transitory machine-readable storage mediums of claim 1, wherein said cluster of nodes includes one or more virtual nodes executing on a computer system.

3. The one or more non-transitory machine-readable storage mediums of claim 1, wherein said cluster of nodes includes one or more physical nodes executing at least one compute container.

4. The one or more non-transitory machine-readable storage mediums of claim 1, wherein at least one node of said cluster of nodes executes two or more compute containers, and wherein said two or more compute containers perform data deduplication on different work sets of said two or more work sets.

5. The one or more non-transitory machine-readable storage mediums of claim 1, wherein the metadata is sharded across multiple nodes of the cluster, and wherein unique portions of data in a file are stored in a distributed file system which is accessible from all nodes of the cluster, and wherein said unique portions of data in the file are unique to the file and are not contained in any other file in said plurality of files.

6. The one or more non-transitory machine-readable storage mediums claim 1, wherein each of said nodes of said cluster of nodes is a separate computer system.

7. The one or more non-transitory machine-readable storage mediums claim 1, wherein each node in said set performs, in parallel, said data deduplication on a different work set without synchronizing with any other node in said cluster of nodes.

8. A system for performing parallelized data deduplication, comprising:
one or more processors; and
one or more non-transitory computer-readable storage mediums storing one or more sequences of instructions, which when executed, cause:
in response to receiving an instruction to perform data deduplication on a plurality of files of a big data dataset, organizing said plurality of files into a plurality of work sets based, at least in part, upon file size, wherein each of the plurality of work sets is a corresponding subset of said plurality of files, wherein each corresponding subset having a collective size below a certain predetermined threshold, wherein said data deduplication is a process which reduces an amount of digital storage required to persistently store said big data dataset by removing certain common portions of said files from said digital storage;
assigning a corresponding work set to a corresponding node included in a cluster of nodes, wherein said cluster of nodes itself performs said assignment of responsibility;
performing data deduplication in parallel by each of the nodes of the cluster, wherein each of the nodes of the cluster is configured to perform data deduplication on a corresponding assigned work set, wherein performing data deduplication comprises storing metadata describing where shared chunks of data are maintained in a distributed file system, and wherein said shared chunks of data are two or more sequences of bytes which appear in two or more of said plurality of files, wherein said metadata is stored in a parallel database and is accessible from any node of said cluster of nodes and the chunks of data are created from a stream, wherein the boundaries of the chunks of data are identified by using one or more fingerprinting algorithms;
in response to a node of the cluster of nodes finishing performing data deduplication on the corresponding assigned work set, assigning an additional work set to the node of the cluster of nodes, wherein the node of the cluster of nodes is configured to perform data deduplication on the assigned additional work set;
aggregating results of performing said parallel data deduplication in said cluster of nodes; and
deleting a deduplicated file, wherein metadata associated with the deleted deduplicated file is stored by the nodes of the cluster, wherein the metadata associated with the deleted deduplicated file indicates that the deduplicated file has been deduplicated.

9. The system of claim 8, wherein said cluster of nodes includes one or more virtual nodes executing on a computer system.

10. The system of claim 8, wherein said cluster of nodes includes one or more physical nodes executing at least one compute container.

11. The system of claim 8, wherein at least one node of said cluster of nodes executes two or more compute containers, and wherein said two or more compute containers perform data deduplication on different work sets of said two or more work sets.

12. The system of claim 8, wherein the metadata is sharded across multiple nodes of the cluster, and wherein unique portions of data in a file are stored in a distributed file system which is accessible from all nodes of the cluster, and wherein said unique portions of data in the file are unique to the file and are not contained in any other file in said plurality of files.

13. A method for parallelized data deduplication, comprising:
in response to receiving an instruction to perform data deduplication on a plurality of files of a big data dataset, organizing said plurality of files into a plurality of work sets based, at least in part, upon file size, wherein each of the plurality of work sets is a corresponding subset of said plurality of files, wherein each corresponding subset having a collective size below a certain predetermined threshold, wherein said data deduplication is a process which reduces an amount of digital storage required to persistently store said big data dataset by removing certain common portions of said files from said digital storage;
assigning a corresponding work set to a corresponding node included in a cluster of nodes, wherein said cluster of nodes itself performs said assignment of responsibility;
performing data deduplication in parallel by each of the nodes of the cluster, wherein each of the nodes of the cluster is configured to perform data deduplication on a corresponding assigned work set, wherein performing data deduplication comprises storing metadata describing where shared chunks of data are maintained in a distributed file system, and wherein said shared chunks of data are two or more sequences of bytes which appear in two or more of said plurality of files, wherein said metadata is stored in a parallel database and is accessible from any node of said cluster of nodes and the chunks of data are created from a stream, wherein the boundaries of the chunks of data are identified by using one or more fingerprinting algorithms;
in response to a node of the cluster of nodes finishing performing data deduplication on the corresponding assigned work set, assigning an additional work set to the node of the cluster of nodes, wherein the node of the cluster of nodes is configured to perform data deduplication on the assigned additional work set;
aggregating results of performing said parallel data deduplication in said cluster of nodes; and
deleting a deduplicated file, wherein metadata associated with the deleted deduplicated file is stored by the nodes of the cluster, wherein the metadata associated with the deleted deduplicated file indicates that the deduplicated file has been deduplicated.

14. The method of claim 13, wherein said cluster of nodes includes one or more virtual nodes executing on a computer system.

15. The method of claim 13, wherein said cluster of nodes includes one or more physical nodes executing at least one compute container.

16. The method of claim 13, wherein at least one node of said cluster of nodes executes two or more compute containers, and wherein said two or more compute containers perform data deduplication on different work sets of said two or more work sets.

17. The method of claim 13, wherein the metadata is sharded across multiple nodes of the cluster, and wherein unique portions of data in a file are stored in a distributed file system which is accessible from all nodes of the cluster, and wherein said unique portions of data in the file are unique to the file and are not contained in any other file in said plurality of files.

* * * * *